United States Patent

Kinnunen et al.

[11] Patent Number: 5,978,367
[45] Date of Patent: Nov. 2, 1999

[54] SYNCHRONIZING A TELECOMMUNICATIONS CONNECTION IN A MOBILE COMMUNICATIONS SYSTEM

[75] Inventors: Kimmo Kinnunen, Jyväskylä; Osmo Schroderus, Sumiainen; Reino Talarmo, Riihimäki, all of Finland

[73] Assignee: Nokia Telecommunications Oy, Espoo, Finland

[21] Appl. No.: 08/817,798

[22] PCT Filed: Aug. 13, 1996

[86] PCT No.: PCT/FI96/00436

§ 371 Date: Apr. 14, 1997

§ 102(e) Date: Apr. 14, 1997

[87] PCT Pub. No.: WO97/07603

PCT Pub. Date: Feb. 27, 1997

[30] Foreign Application Priority Data

Aug. 14, 1995 [FI] Finland .................................. 953845

[51] Int. Cl.[6] .................................................. H04B 7/212
[52] U.S. Cl. .......................... 370/337; 370/465; 455/426; 455/434
[58] Field of Search .................................. 370/276, 277, 370/278, 280, 313, 314, 327, 328, 329, 337, 340, 347, 465; 455/422, 426, 450, 455, 509, 524, 525, 526

[56] References Cited

U.S. PATENT DOCUMENTS

| 5,617,412 | 4/1997 | Delprat et al. ........................ 370/281 |
|---|---|---|
| 5,636,243 | 6/1997 | Tanaka .................................... 375/219 |
| 5,771,463 | 6/1998 | Lehmusto et al. .................... 455/524 |
| 5,781,860 | 7/1998 | Loppönen et al. .................... 455/426 |
| 5,790,938 | 8/1998 | Talarmo ................................ 455/11.1 |

FOREIGN PATENT DOCUMENTS

| 663 737 | 7/1995 | European Pat. Off. . |
|---|---|---|
| 689 303 | 12/1995 | European Pat. Off. . |
| 2 290 677 | 1/1996 | United Kingdom . |

Primary Examiner—Chau Nguyen
Assistant Examiner—Soon-Dong Hyun
Attorney, Agent, or Firm—Pillsbury Madison & Sutro LLP

[57] ABSTRACT

A method of synchronizing a telecommunications connection in a mobile communications system having at least one base station, and having a first and at least a second mobile station communicating on a direct mode channel, the first mobile station operating on the direct mode channel transmits a registration message to the base station of the mobile communications system on a system channel of the mobile communications system, the registration message indicating a wish of the first mobile station to operate in dual watch mode on the control channel of the mobile communications system. In response to the registration message, a specific control channel of the base station and the timing information related to the control channel are communicated to the first mobile station, the first mobile station switches to dual watch mode in order to communicate either on the direct mode channel or on the allocated control channel during the time indicated by the timing information.

15 Claims, 6 Drawing Sheets

SYNCHRONIZING A TELECOMMUNICATIONS CONNECTION IN A MOBILE COMMUNICATIONS SYSTEM

This application is the national phase of international application PCT/FI96/00436, filed Aug. 13, 1996 which designated the U.S.

FIELD OF THE INVENTION

The invention relates to a method for synchronizing a telecommunications connection in a mobile communications system comprising at least one base station communicating on system channels of the mobile communications system, the channels consisting of control channels and traffic channels; a first and at least a second mobile station communicating on a direct mode channel divided into frames consisting of time-slots.

BACKGROUND OF THE INVENTION

The invention relates to the field of mobile telephone systems. A subscriber of a mobile telephone system, that is, a subscriber station, e.g. a mobile telephone or a mobile station may be connected to a mobile network or system, whereby it is connected to the mobile network via system channels maintained by the base stations of the mobile network, the system channels consisting of control channels and traffic channels.

In addition to the system channels located in mobile telephone systems, so-called direct mode channels may be used in association with the mobile system, i.e. communication takes place in a direct mode. Subscriber stations communicating in the direct mode do not communicate directly with the mobile network or the base stations related to it. Direct mode channels are frequencies on which mobile telephones or other means of communication can communicate without the system directly with each other, or via repeater stations, either with the base stations of the system or with other mobile stations.

Direct mode channels are typically used in situations in which e.g., a group of hand-held mobile phones which communicate with each other are so remote from the base stations that the use of system channels is not possible.

Another important use of direct mode channels is increasing the capacity when the traffic in the system rapidly increases, e.g. due to an incident occuring in some part of the service area of the system, e.g. in some spot-like part.

A direct mode channel is a channel that is typically not used by the system. It may be e.g., a channel whose channel spacing is the same as that in the mobile communications system, e.g. 12.5 kHz or 25 kHz. On direct mode channels, a mode of simplex operation is used. From the group of the mobile stations operating on the direct mode channel, the transmitting party has tuned his or her transmitter onto the channel and is transmitting speech or data information. The other mobile stations that have been activated onto the direct mode channel have tuned their receivers onto the same frequency so that they will directly hear the transmission.

On a direct mode channel, communication may take place by means of analog modulation or digital modulation. A mobile station transmitting on the channel may also use signalling information, such as information on access rights and priorities, or the group communicating on the channel, or data communication. On a direct mode channel, encryption may be carried out, or plain speech can be transmitted.

Subscriber stations operating in the direct mode communicate with other subscriber stations on a direct mode channel without having a direct connection to the base stations of the mobile network. Subscriber stations operating in the direct mode, however, may communicate with the mobile network via repeater stations. A repeater station is a unit in which there are two transceivers connected to each other. A repeater station typically comprises two transceivers. The repeater station forwards information messages transmitted on the direct mode channel to the desired network elements, such as the base stations of the radio network, which will forward the information messages to the exchanges of the radio network. Information messages forwarded by the repeater station may be e.g., speech, or data or signalling messages. When the repeater station is being used, e.g. a semiduplex mode of operation may be used on the direct mode channel.

A problem related to a prior art solution is how to make the mobile station operate upon request in accordance with the dual watch mode, that is, to communicate "simultaneously" on the direct mode channel and the system channels of the mobile communications system. A mobile station operating in the dual watch mode on the direct mode channel may receive transmissions of the system channels of the mobile communications system between time-slots received on the direct mode channel. A dual watch function of this kind has not been implemented before between a mobile station operating on the direct mode channel, and a mobile communications system. This kind of a situation is attended by the drawback that the frame synchronization of the direct mode channel will be changed with respect to that of the mobile communications system, in which case it is difficult or even impossible for the mobile station to make use of the dual watch mode.

Another problem related to prior art solutions is the fact that the mobile communications system does not know whether the mobile station is in the dual watch mode or not, in which case it is difficult for the system to co-operate with the mobile station possibly operating in the dual watch mode.

Yet another problem related to prior art solutions is the fact that the mobile communications system does not know the identifier of the direct mode channel on which the mobile station in the dual watch mode is operating.

SUMMARY OF THE INVENTION

The object of this invention is to implement a method and a mobile communications system by means of which the problems related to the prior art may be solved.

The object of the invention is to enable the use of the dual watch mode in a mobile station that is operating on a direct mode channel and also communicating in the dual watch mode on the system channels of the mobile communications system.

This novel method for synchronizing a telecommunications connection will be achieved with a method in accordance with the invention, which is characterized by the steps of: a first mobile station operating on the direct mode channel transmitting a registration message to the base station of the mobile communications system on the system channel of the mobile communications system, by means of which registration message the first mobile station communicates its wish to operate in the dual watch mode on the control channel of the mobile communications system; in response to the registration message, communicating to the first mobile station a specific control channel of the base station and the timing information related to the control channel; the first mobile station switching to the dual watch mode for communicating either on the direct mode channel or the allocated control channel during the time indicated by the timing information.

The invention further relates to a mobile communications system comprising: at least one base station communicating on the system channels of the mobile communications system, a first and at least a second mobile station operating on a direct mode channel divided into frames consisting of time-slots.

The mobile communications system of the invention comprises communicating means for communicating the specific control channel of the desired base station and the timing information related to the control channel to the first mobile station operating on the direct mode channel.

The invention further relates to a mobile station operating on a direct mode channel divided into frames consisting of time-slots, the mobile station comprising: a memory means, a transceiver which is arranged to transmit and receive transmissions of the mobile station, a controller for controlling the operation of the mobile station.

The mobile station of the invention comprises transmission means for transmitting the timing information to one or more other mobile stations on the direct mode channel, the timing information containing the identifier of the mobile communications system used and its control channel, as well as the timing information related to said control channel.

The mobile station of the invention comprises synchronizing means for shifting the start time of a frame or a time-slot of a direct mode channel transmission with respect to the start time of a frame or a time-slot in accordance with the synchronization of the control channel of the mobile communications system in response to the synchronization information transmitted by the second mobile station, or a base station or a repeater station of the mobile communications system.

The invention is based on the idea that the timing of the transmission of the mobile stations operating on the direct mode channels in the dual watch mode is synchronized with the transmission of the control channels of the base station of the mobile communications system. The mobile stations operating on the direct mode channel are synchronized in such a manner that when a mobile station operating on the direct mode channel wishes to operate in the dual watch mode, it will report to a base station of the system and communicate, when necessary, its wish to operate in the dual watch mode on said direct mode channel and on the control channel of the mobile communications system. In addition, the mobile station may provide the mobile communications system with the identifier of the direct mode channel on which it is operating. Thereafter, the mobile communication system will accept the mobile station to the system and assign to it an appropriate control channel from the desired base station for the dual watch mode, and indicate the synchronization of the channel. Thereafter, the mobile station will shift to the direct mode channel and adapt the time-slot and frame synchronization of its own transmission, and, if need be, the time-slot and frame synchronization of the other mobile stations operating on the direct mode channel in order that it will correspond to the synchronization of the control channel of the mobile communications system. In other words, the transmission of the mobile station and the dual watch operation are timed in order that the transmission time-slot of the mobile stations will allow the mobile stations operating on the direct mode channel to listen to the control channel between the transmission time-slots of the direct mode channel.

The above-mentioned adaptation is carried out by means of either of the embodiments disclosed in the following:

In accordance with a first embodiment, the adaptation is carried out in a situation in which there is no ongoing traffic on the direct mode channel in question, that is, the direct mode channel that is intended to be used is free. Thus, the mobile station will transmit a synchronization identifier on the direct mode channel to other mobile stations operating on the direct mode channel. The synchronization identifier contains e.g., at least a part or all of the following information: the identifier of the transmitting mobile station, the identifiers of the mobile communications system and of the control channel used, the information on the carrier wave of the control channel, as well as the information on timing, that is, on the hyperframe, the multiframe and the time-slot. The mobile station may transmit the synchronization identifier several times at desired intervals. The other mobile stations operating on the direct mode channel will receive this synchronization identifier and synchronize their own transmission by means of it so that the transmission of the mobile stations will be arranged in the way disclosed above.

In accordance with a second embodiment, the adaptation is carried out in a situation where a mobile station is already transmitting on the direct mode channel, that is, where it is endeavored to alter the synchronization during a call. In accordance with the second embodiment, the mobile station will alter the synchronization of its transmission taking place on the direct mode channel only after it has detected that some other mobile station is transmitting on the direct mode channel. Altering the synchronization may be carried out as follows in accordance with the different variations of this embodiment:

1. The frame synchronization will be altered during the transmission turn of the other mobile station by interrupting the transmission turn of the other mobile station and re-synchronizing it in the desired manner.

2. A second, probably the most practical way is to alter the synchronization during a call, but between the transmission turns. In other words, the synchronization will be altered after the transmission turn of the other mobile station has ended, by sending a synchronization message.

3. The third way is to carry out the synchronization at the beginning of the actual transmission turn of the mobile station.

This embodiment has the advantage that the mobile station that is carrying out/altering the synchronization of the direct mode channel does not need to transmit a synchronization identifier unless it is sure that there is ongoing traffic on the direct mode channel in question, e.g. by listening to the direct mode channel in question.

The invention is further based on the idea that the frame structures of the system channel and the direct mode channel must be in synchronism with each other for implementing the measures related to the dual watch mode and simplifying the maintenance of the frame synchronization. It is another object of this invention that, upon registering to the system, a mobile station operating in the dual watch mode reports that it is operating in the dual watch mode and provides the identifier of the direct mode channel on which the mobile station is operating. It is also possible for the mobile communications system to use a common address (identifier) it has determined for the mobile stations, for managing the traffic taking place on the direct mode channel.

It is optional for the method of the invention that the mobile station communicates to the mobile communications system that it is operating in the dual watch mode. It is also optional for the mobile communications system to treat the mobile station in the dual watch mode differently from the other mobile stations. On the other hand, the system may command all the dual watch mobile stations onto a specific control channel for avoiding the situation in which two mobile stations are connected to the same base station, but listening to separate control channels, i.e. attempting a dual watch synchronization to separate time-slots.

An advantage of the invention in accordance with this application is that it solves the problems related to the prior art solutions.

Another advantage caused by implementing the frame synchronization in accordance with the invention is the fact that a mobile station operating in the dual watch mode only requires one system for maintaining the synchronization.

Another advantage of the invention is the fact that planning the dual watch mode will be facilitated since the synchronization between the mobile stations and the system may be assumed to be stable on account of the invention.

BRIEF DESCRIPTION OF THE DRAWINGS

In the following, the invention will be disclosed in closer detail with reference to the attached drawings, in which.

DETAILED OF THE PREFERRED EMBODIMENTS

Figure 1:
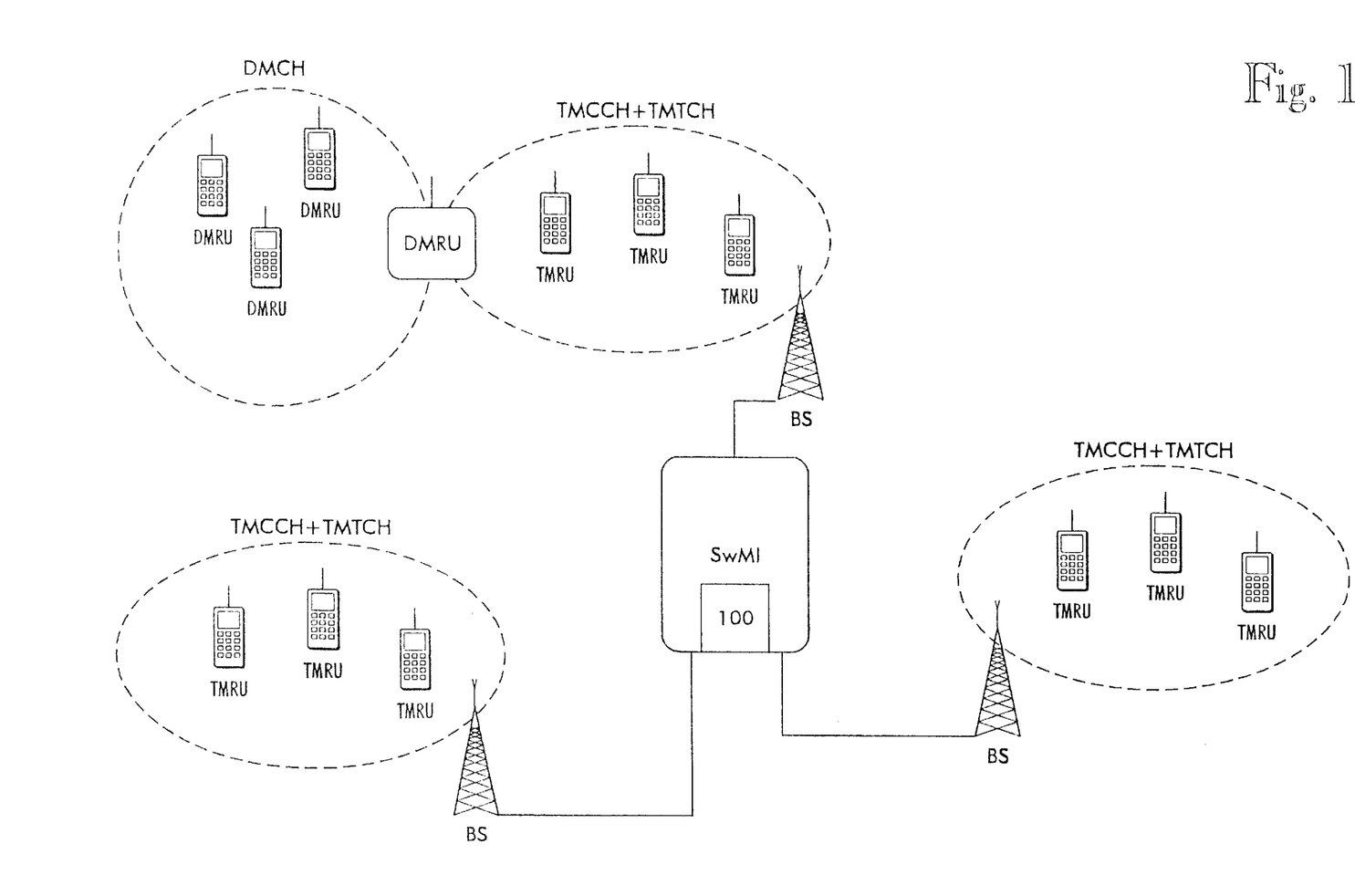
FIG. 1 shows a block diagram of a mobile communications system of the invention in which the method of the invention may be applied.

FIG. 1 shows a block diagram of a mobile communications system of the invention in which, e.g., the method of the invention may be applied. The mobile communications system may also comprise mobile stations TMRU operating on the system channels TMCCH, TMTCH, a direct mode channel DMCH, system channels TMCCH and TMTCH, base stations BS and a system SwMI. The system SwMI may comprise, e.g., an exchange of the mobile communications system, transmission equipments, and an operations and maintenance center. The invention is particularly related to mobile stations DMRU operating on the direct mode channel DMCH, and especially the operation of those mobile stations DMRU in the dual watch mode in synchronism with the control channels of the mobile communications system. FIG. 1 also shows a mobile station DMRU operating in the dual watch mode.

The invention relates to a mobile communications system (FIG. 1) comprising: at least one base station BS communicating with on the system channels of the mobile communications system, and a first and at least a second mobile station DMRU; 400 (FIG. 7) operating on a direct mode channel divided into frames consisting of time-slots.

The mobile communications system of the invention is characterized by comprising: communicating means 100 for communicating a desired control channel of a desired base station and timing information related to said control channel to the first mobile station DMRU; 400 (FIG. 7) operating on the direct mode channel.

Figure 2:
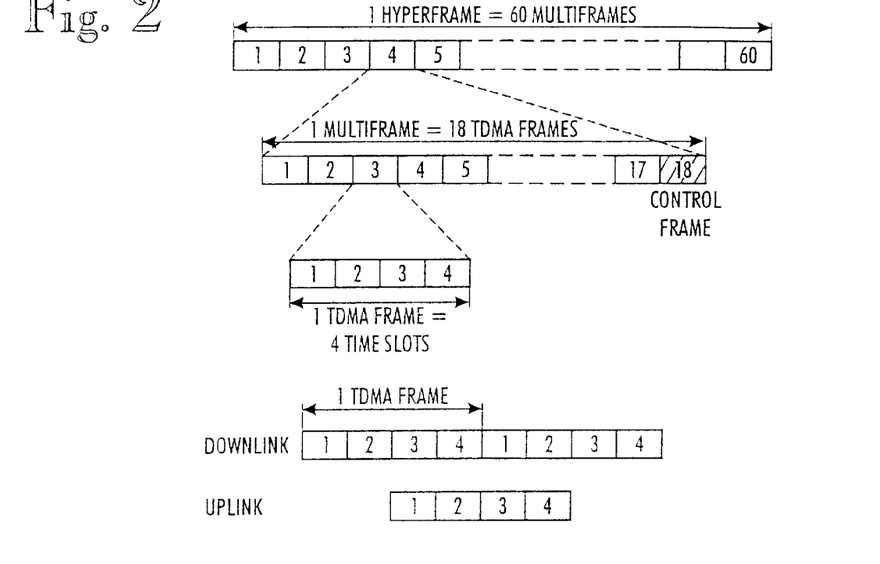
FIG. 2 shows the frame structure of the TETRA mobile communications system.

FIG. 2 shows the frame structure of the TETRA mobile communications system. On system channels, the frame structure of the uplink frequency, that is, the direction from the mobile station to the base station (RU→BS), is delayed by two time-slots compared with the frame structure of the downlink frequency, that is, the direction from the base station to the mobile station (BS→RU) in accordance with the TETRA protocol. The direct mode channel is also divided into frames and time-slots physically in the same way. There is, however, only one frequency, which is used for communication in both directions.

Figure 3:
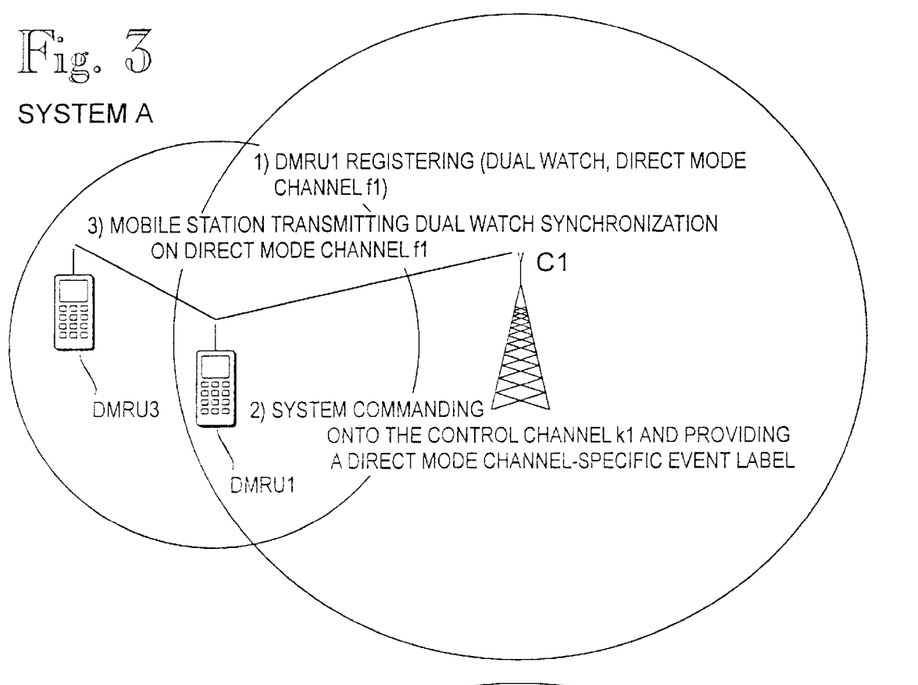
FIG. 3 shows the registration of a first mobile station DMRU1 to the mobile communications system A and transmission of a dual watch synchronization identifier on a direct mode channel f1.

FIG. 3 shows a situation in which a mobile station DMRU1 wishes to operate in the dual watch mode between a base station C1 of the system A and a direct mode channel f1. In FIG. 3, mobile station DMRU1 reports, i.e. registers to the system via the base station C1. In association with the registration, DMRU1 also reports it is operating in the dual watch mode and possibly the identifier of the direct mode channel it is using. Reporting the identifier of the direct mode channel enables the system to shift the mobile stations operating on the same direct mode channel onto the same control channel in accordance with the dual watch mode. In accordance with another approach, the system will direct the mobile stations operating in the dual watch mode to the same control channel every time only on the basis of the dual watch request made by the mobile stations, regardless of which direct mode channel is in question. The system A will accept mobile station DMRU1 to the system and assign to it a control channel k1 (MCCH, SCCH) of the base station C1.

Figure 4:
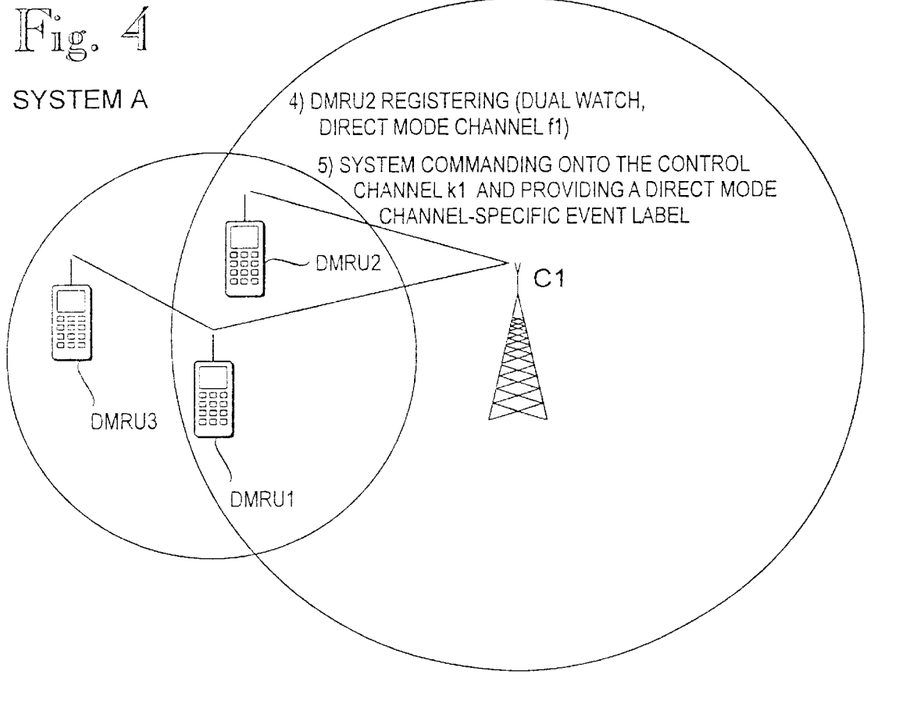
FIG. 4 shows the registration of a mobile station and starting the operation on the direct mode channel.
Figure 5:
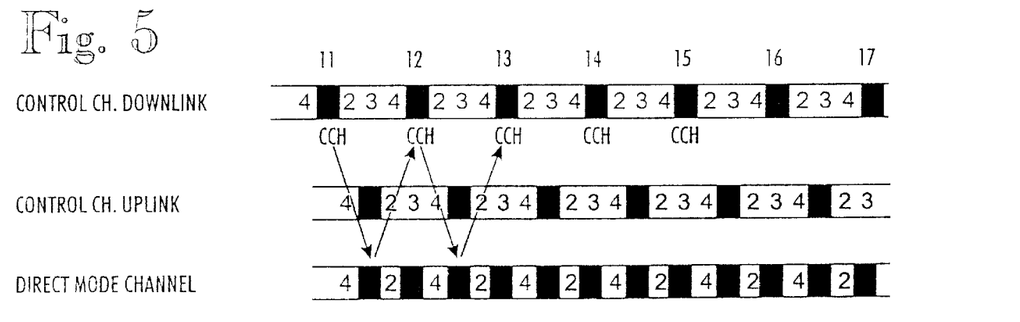
FIG. 5 illustrates implementing time-slot synchronization in accordance with the invention for achieving a dual watch mode between the direct mode channel and the control channel of the mobile communications system.

FIG. 4 shows a situation in which the first mobile station DMRU1 shifts onto the direct mode channel f1. If need be, DMRU1 attempts to adapt the time-slot synchronization of the direct mode channel f1 to correspond to the control channel k1 of the entire mobile communications system. Correspondence herein refers to the fact that the transmission time-slot of the direct mode channel f1 will be arranged in such a way that the control channel of the system can be listened to simultaneously. FIG. 5, which will be explained below, illustrates the synchronization between the direct mode channel and the channels of the mobile communications system. In addition, there must be a frame synchronization between the direct mode channel and the base station of the system.

The adaptation mentioned above may be carried out using two approaches:

In accordance with the first approach, in a case where the direct mode channel is available, that is, there is no ongoing traffic on the direct mode channel, mobile station DMRU1 will transmit a synchronization identifier that contains the identifier of mobile station DMRU1, the identifier A of the system, the identifier of the base station C1, as well as the information related to the control channel k1 (carrier wave, hyperframe, multiframe, time-slot). This synchronization information is then repeated at appropriate intervals. Once the traffic has started, the transmitting mobile station will indicate that the direct mode channel is in the dual watch mode.

In the second approach, mobile station DMRU1 will alter the synchronization only when someone is transmitting on the direct mode channel. This approach has the advantage that mobile station DMRU1 does not need to transmit the synchronization identifier on the direct mode channel at regular intervals.

A second mobile station DMRU2 to be activated on the direct mode channel and wishing to operate in the dual watch mode will report to the system A of the same base station C1 as indicated in the synchronization transmission of the direct mode channel. The system will command the second mobile station DMRU2 onto the same control channel as the one on which the first mobile station DMRU1 is, by making use of the information related to the first mobile station DMRU1 (dual watch mode, direct mode channel identifier, control channel) and transmitted in the synchronization identifier mentioned above. Reporting the identifier of the direct mode channel to the system enables the fact that the system may treat the dual watch mobile stations operating on the direct mode channel as one group.

FIG. 5 illustrates implementing time-slot synchronization in accordance with the invention for achieving a dual watch function between the direct mode channel and the control channel of the mobile communications system. FIG. 5 shows the first time-slots of the control channels and the first and the third time-slots of the direct mode channel with black color for comparing their co-incidence with respect to each other. FIG. 5 shows an illustration of frame synchronization in a situation in which the transmission of a mobile station or mobile stations transmitting on a direct mode channel is synchronized with the downlink synchronization of the control channel of the system so that the mobile stations will be able to operate in accordance with the dual watch mode, that is, they will be able to transmit and receive both on the direct mode channels and on the channels of the mobile communications system, e.g. receive transmissions in the downlink direction of the control channel, as shown in FIG. 5. The arrows shown in FIG. 5 illustrate how a transmission turn shifts in accordance with the dual watch mode from the downlink frequency of the control channel to the mobile stations operating on the direct mode channel, and vice versa.

Figure 6:
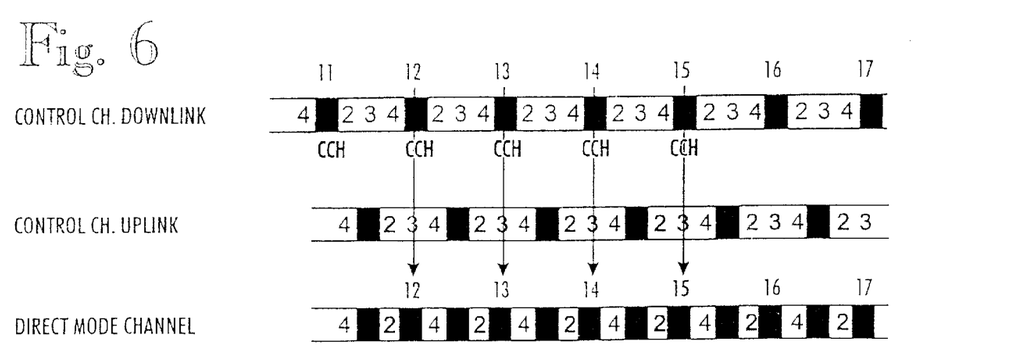
FIG. 6 illustrates implementing frame synchronization in accordance with the invention for achieving a dual watch mode between the direct mode channel and the control channel of the mobile communications system.

FIG. 6 shows an illustration of frame synchronization, illustrating the implementation of frame synchronization for achieving a dual watch mode between the direct mode channel and the control channel of the mobile communications system. In the figure, the first time-slots of the system channel and the first and the third time-slots of the direct mode channel are marked with black for comparing their co-incideince with respect to each other. This is illustrated with the arrows shown in FIG. 6. The sequence numbers related to the frames of the control channel of the system and to the frames of the direct mode channel are also marked in FIG. 6. By means of the arrows shown in the figure, it is possible to make a comparison and detect that in accordance with the invention, the frame synchronization of the direct mode channel has been so arranged with the frame synchronization of the control channel of the system that, e.g., frame number 12 of the direct mode channel corresponds to the frame number 12 of the control channel.

Figure 7:
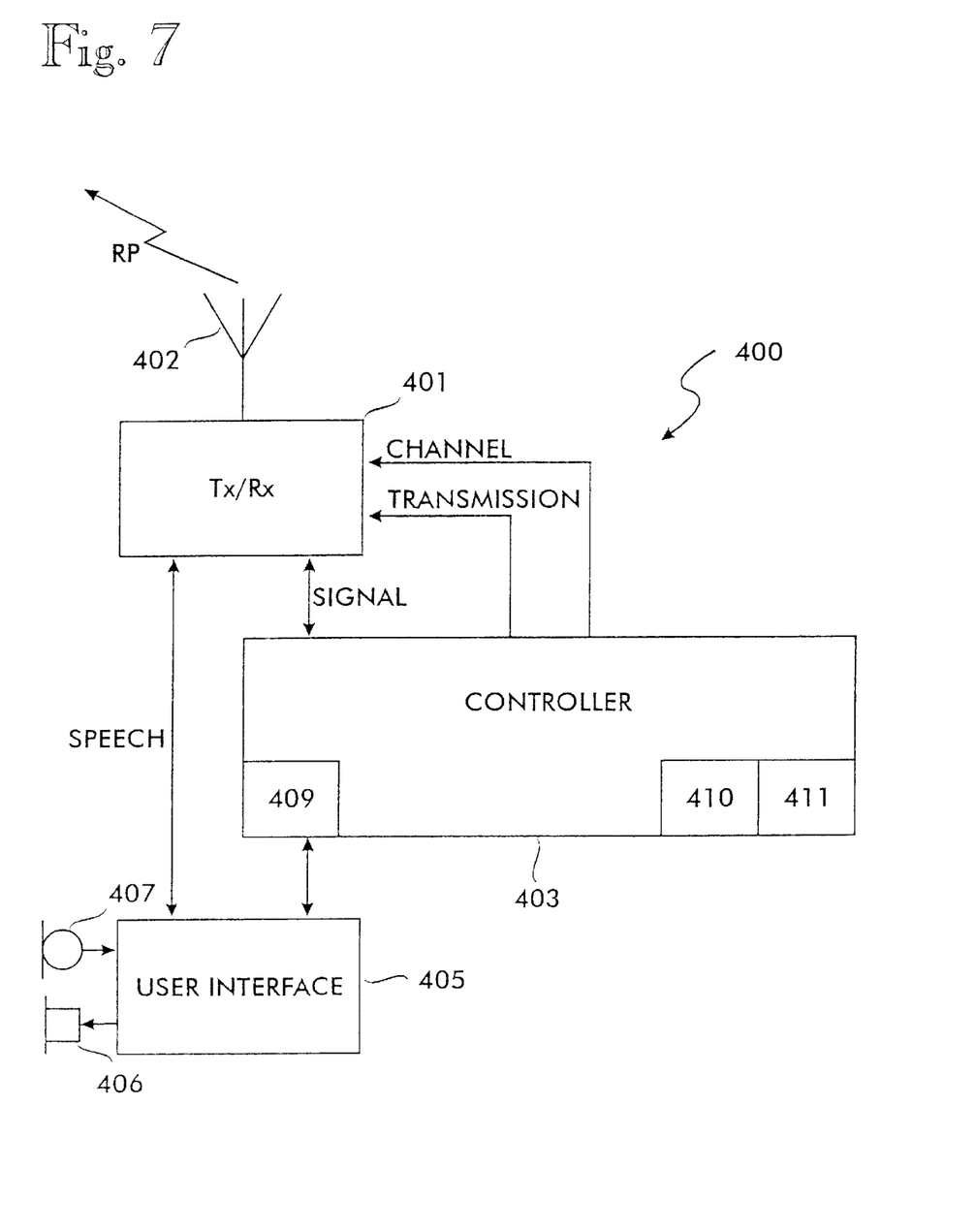
FIG. 7 shows a block diagram of the mobile station of the invention operating on the direct mode channel.

FIG. 7 shows a block diagram of the mobile station 400 of the invention, operating on the direct mode channel, that is, a mobile telephone, mobile station or subscriber station used by a subscriber. The function of a transceiver station (TX/RX) 401 is to adapt to the radio channel used at a current moment. The transceiver 401 is connected to an antenna 402, which communicates with the radio path RP. Radio frequencies that are normally used are within the range 60–1000 MHz (VHF and UHF frequency bands), although other frequencies may also be used. On the radio path RP, analog modulation may be employed, whereby the modulation method is usually phase modulation. Other modulation techniques may also be used. For transmitting signalling, e.g. Fast Frequency Shift Keying Modulation (FFSK) may be employed. Transmission on the radio path may also be digital.

A user interface 405 comprises electroacoustic transducer means, typically a loudspeaker 406 and a microphone 407, and possibly buttons related to beginning, ending and dialling a call. As in a trunking system and especially on a direct mode channel a call on the radio path RP advantageously takes place in turns, the user equipment in most cases has a push-to-talk button that must be pressed down during the speech turn. The push-to-talk button is not shown in FIG. 7.

The task of a controller 403 is to control the operation of the mobile station. The controller 403 is connected to the user interface 405, from which it receives impulses associated with call initiation and termination. The controller 403 may also provide the user with sound or visual signs related to the operation of the mobile station and/or the mobile communications system via the user interface 405.

The controller 403 is connected to a transceiver TX/RX401. The channel used by the transceiver has been determined by the controller 403, that is, the transceiver 401 is tuned onto the channel, or the radio frequency determined by the controller 403, and to an appropriate time-slot. The mobile station of the invention is able to tune onto the direct mode channel and onto the uplink and downlink channels and frequencies of the system channels. The transceiver 401 is also switched on under the control of the controller 403. The controller 403 receives and transmits signalling messages via the transceiver 401. The mobile station 400 of the invention communicating on the direct mode channel may be used, e.g., in a mobile communications system comprising a mobile network comprising at least one base station and subscriber stations, and possibly one or more repeater stations for forwarding traffic between at least one base station and the subscriber stations communicating on the direct mode channel. In such a case, the mobile station communicating on the direct mode channel comprises a memory means 411, a transceiver 401 and a controller 403 for controlling the operation of the mobile station.

The mobile station 400 DMRU; 400, (FIG. 7) of the invention, operating on the direct mode channel divided into frames consisting of time-slots comprises: memory means 411, a transceiver 401 arranged to receive and transmit transmissions of the mobile station, and a controller 403 for controlling the operation of the mobile station. The mobile station 400 according to the invention comprises: transmission means 409 for transmitting, to one or more second mobile stations, synchronization information containing the identifier of the mobile communications system used and the identifier of its control channel, as well as the timing information related to said control channel.

The mobile station of the invention DMRU; 400; (FIG. 7) further comprises synchronizing means 410 for shifting the start time of a frame or a time-slot of a direct mode channel transmission with respect to the start time of a frame or a time-slot in accordance with the synchronization of the control channel of the mobile communications system in response to the synchronization information transmitted by a second mobile station, or a base station BS or a repeater station RS of the mobile communications system. It must be noted that the synchronizing means may be placed in such a mobile station that also comprises the transmission means 409 disclosed above, or in a conventional mobile station that is operable on the direct mode channel.

The mobile station DMRU; 400 (FIG. 7) according to the invention as disclosed above is arranged to store in its memory 411 a received synchronization information transmitted by a second mobile station DMRU, a base station BS or a repeater station RS of the mobile communications system, the synchronization information indicating the start time of a frame or a time-slot in accordance with the adapted synchronization with respect to the start time of a TDMA frame or a time-slot.

Figure 8:
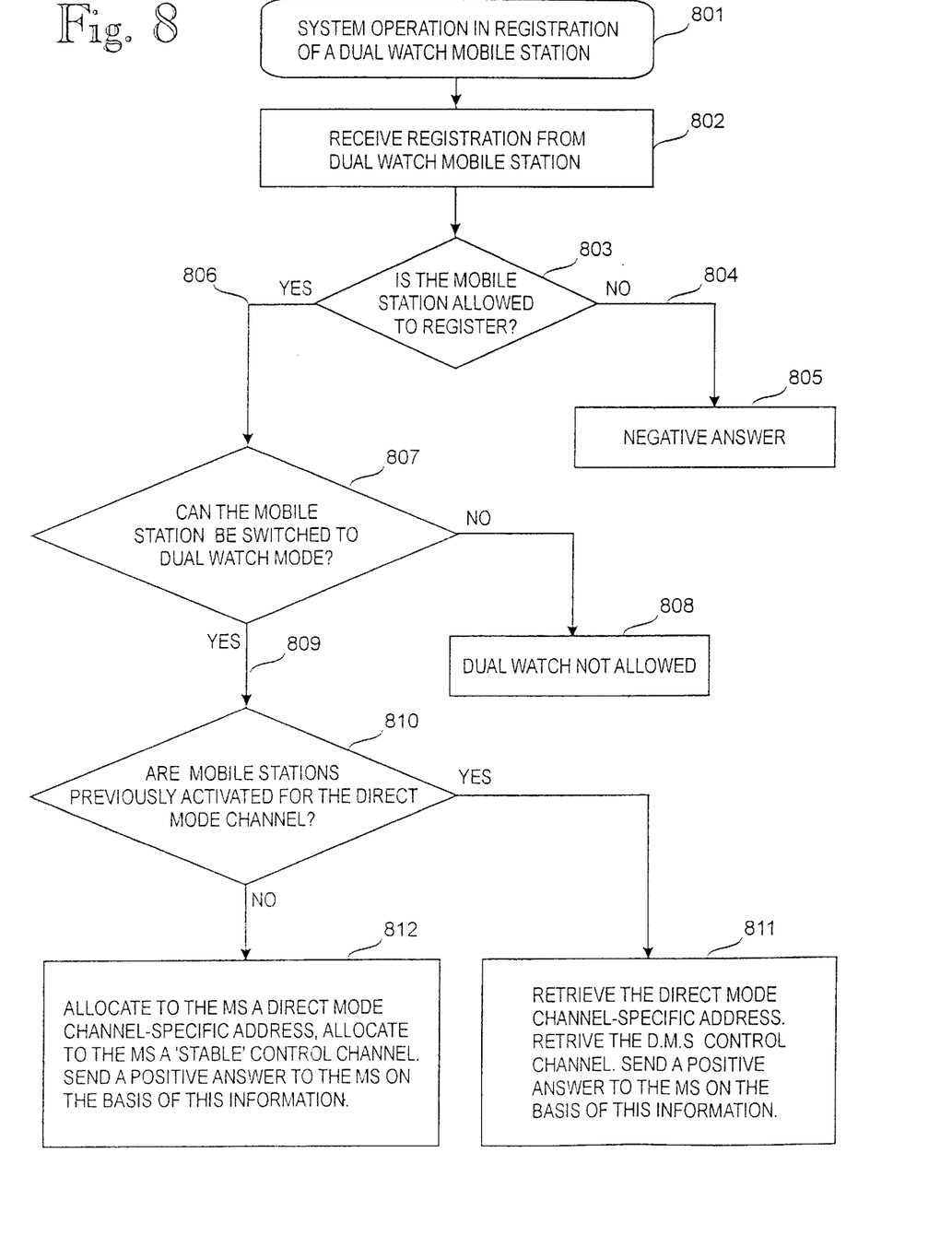
FIG. 8 shows a flow chart of the synchronization of the system channel and the direct mode channel frame structures according to the invention.

FIG. 8 shows a flow chart of the synchronization of the system channel and the direct mode channel frame structures in accordance with the invention. The operation of the method of the invention in the dual watch mode will start when the mobile station registers 801 by transmitting its own registration message to the base station of the mobile communications system on the control channel. The mobile communications system will receive 802 the registration of the dual watch mobile station and check 803 whether said mobile station is allowed to register to the mobile communications system. In case the database of the mobile communications system contains such an information that the mobile station is not allowed 804 to register to the system, the mobile station will be given a negative answer 805. If, instead, the mobile station is allowed 806 to register to the mobile communications system, it will be checked 807 whether the mobile station is allowed to be in the dual watch mode. In case the dual watch mode is not allowed 808, the mobile station will not be allowed to start operating in the dual watch mode. If, instead, the mobile station is allowed 809 to operate in the dual watch mode, it will first be found out whether mobile stations have already been activated for the direct mode channel in question. If this is the case 811, then the control channel and the direct mode channel specific address previously allocated for the mobile station will be retrieved. Once these measures for registrating the mobile station to the network have been carried out, a positive answer regarding the registration to the network will be transmitted to the mobile station. If, again, no mobile stations have previously been activated 812 for the direct mode channel in question, a direct mode channel specific address will be allocated to the mobile station, and a direct mode channel-specific "stable" control channel will be allocated to the mobile stations operating on the direct mode channel. Again, after these steps for registering to the network have been taken by the mobile station, the mobile station will be transmitted a positive answer regarding the registration to the network, as above.

Figure 9:
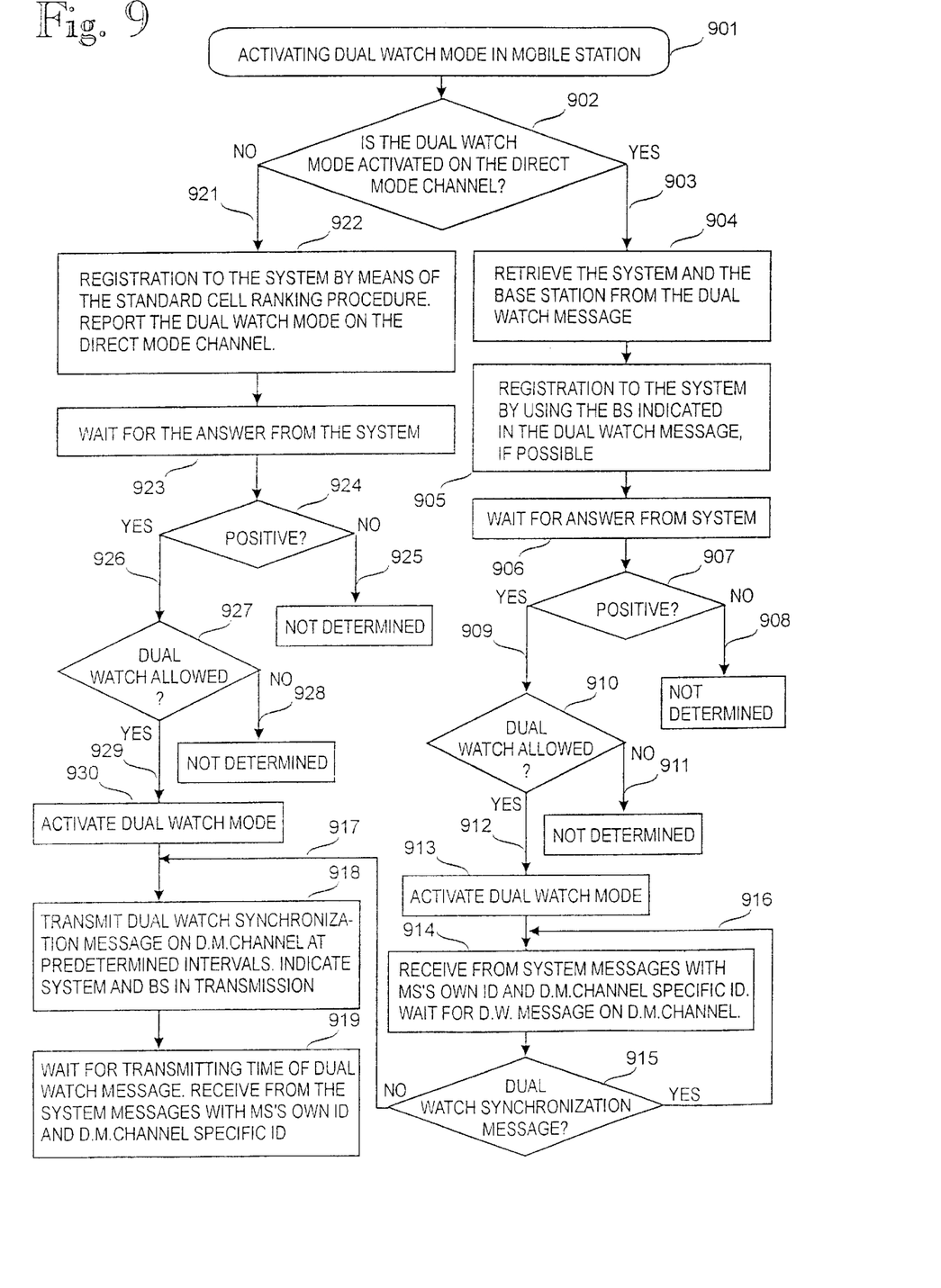
FIG. 9 shows a flow chart of the synchronization of the system channel and direct mode channel frame structures in accordance with the invention.

FIG. 9 shows a flow chart of the synchronization of the system channel and direct mode channel frame structures in accordance with the invention in a situation in which an attempt is made 901 for activating the dual watch mode in a mobile station operating on the direct mode channel. Firstly, it will be checked 902 whether the dual watch mode has been activated on the direct mode channel. If this is the case 903, the system in question and the base station related to the system will be found out 904 on the basis of a dual watch message received on the direct mode channel. Thereafter, the mobile station will report 905 to the mobile communications system using the base station indicated in the dual watch message, if possible. Thereafter the mobile station will wait 906 for the answer from the system, and in case the answer is negative 908, the mobile station will not make any re-attempts for activating the dual watch mode with the system. If, instead, the answer is positive 909, it will be checked 910 whether the dual watch mode is allowed with the mobile communications system in question. In case the dual watch mode is not allowed 911, the mobile station will not be able to start operating in the dual watch mode on said direct mode channel. If, instead, the dual watch mode is allowed 912, the mobile station will start 913 the dual watch operation on the direct mode channel. The mobile station will thus receive 914 messages from the mobile communications system both with its own identifier and with the direct mode channel specific identifier in accordance with the dual watch mode. The mobile station will thus wait and monitor 915 whether it is receiving on the direct mode channel a dual watch message, that is, the synchronization identifier in accordance with the invention. If the dual watch message, i.e. the synchronization identifier according to the invention is received 916 on the direct mode channel, the procedure will return to step 914, whereby the mobile station will again receive messages from the mobile communications system both with its own identifier and with the direct mode channel specific identifier in accordance with the dual watch operation. If the message in question is not 917 a dual watch message, the procedure will shift to step 918, in which the mobile station will transmit synchronization identifiers, i.e. synchronization messages to the direct mode channel at desired intervals. In the synchronization messages, the mobile station will communicate to the other mobile stations operating on the direct mode channel which mobile communications system and base station it is using. Thereafter, in step 919 the mobile station will further wait for an appropriate (new) transmission time for the synchronization message and receive from the mobile communications system messages (calls) in accordance with the dual watch mode provided both with its own identifier and with a direct mode channel specific identifier.

If, instead, it is detected in step 902 that the dual watch mode is not activated 921 on the direct mode channel in question, the mobile station will report 922 to the mobile communications system using the standard "cell ranking" procedure. The mobile station thus also communicates to the system its wish to operate in the dual watch mode, and the identifier of the direct mode channel it is using. The mobile station will then wait 923 for the answer from the system and check 924 the quality of the answer. In case the answer is negative 925, the mobile station will make no attempt to activate the dual watch mode between the direct mode channel and the mobile communications system. If, instead, the answer is positive 926, it will be checked in step 927 whether the dual watch mode is allowed on the direct mode channel with said mobile communications system. If this is not the case 928, the mobile station will not attempt to activate the dual watch mode. If, instead, the dual watch mode is allowed 929, the mobile station will start to operate in the dual watch mode 930, whereafter the procedure will shift to steps 918, 919 and 920 described above.

The drawings and the explanation associated therewith are only intended to illustrate the idea behind the invention. In details, the method and the mobile communications system of the invention may vary within the scope of the attached claims. Although the invention has been explained mainly in connection with trunked mobile communications systems, it is also possible to apply the invention in other kinds of mobile communications systems.

We claim:

1. A method for synchronizing a telecommunications connection in a mobile communications system having at least one base station communicating on system channels of the mobile communications system, these system channels including both at least one control channel and at least one traffic channel, and having a first mobile station arranged for communicating on a direct mode channel divided into frames consisting of time-slots, comprising the steps of:

transmitting from the first mobile station a registration message to a said base station of the mobile communications system on a system channel of the mobile communications system, by which registration message the first mobile station communicates a wish of the first mobile station to operate in dual watch mode on a control channel of the mobile communications system;

communicating by said base station to the first mobile station, in response to said registration message, identification of a specific control channel of the base station allocated for use by the first mobile station for operating in dual watch mode, and timing information related to synchronization of said specific control channel; and the first mobile station, in response to said communicating, switching to dual watch mode for communicating alternatively on said direct mode channel and said specific control channel during times indicated by said timing information.

2. A method as claimed in claim 1, wherein:

said transmitting includes communicating from the first mobile station to said base station, in said registration message, information as to the direct mode channel on which said first mobile station wishes to operate in dual watch mode.

3. A method as claimed in claim 1, further comprising:

transmitting from the first mobile station synchronization information to one or more second mobile stations on said direct mode channel, said synchronization information containing timing information related to said specific control channel; and shifting the start time of a frame of a time-slot of a direct mode channel transmission of at least one second mobile station with respect to the start time of a frame or a time-slot in accordance with the synchronization of said specific control channel of said mobile communications system, for achieving an adapted synchronization, which is adapted in accordance with said synchronization information transmitted by said first mobile station.

4. A method as claimed in claim 3, wherein:

said synchronization information contains an identifier for said mobile communications system.

5. A method as claimed in claim 4, wherein:

said transmitting of synchronization information includes transmitting from said first mobile station a transmission of said first mobile station in accordance with said adapted synchronization so that the start time of each frame according to the adapted synchronization to be transmitted on said direct mode channel is shifted with respect to the synchronization of said specific control channel such that a first time-slot according to the adapted synchronization coincides with a first uplink time-slot of said specific control channel.

6. A method as claimed in claim 5, wherein: said transmitting of synchronization information includes transmitting from said first mobile station in accordance with said adapted synchronization such that the start time of each frame according to the adapted synchronization to be transmitted on said direct mode channel is shifted with respect to the synchronization of said specific control channel so that each frame according to the adapted synchronization of said direct mode channel coincides with a respective corresponding uplink frame of said specific control channel of the mobile communications system.

7. A method as claimed in claim 4, wherein:

said transmitting of synchronization information includes transmitting from said first mobile station in accordance with said adapted synchronization such that the start time of each frame according to the adapted synchronization to be transmitted on said direct mode channel is shifted with respect to the synchronization of said specific control channel so that each frame according to the adapted synchronization of said direct mode channel coincides with a respective corresponding uplink frame of said specific control channel of the mobile communications system.

8. A method as claimed in claim 13, wherein:

said transmitting of synchronization information includes transmitting from said first mobile station a transmission of said first mobile station in accordance with said adapted synchronization in such a way that frames in accordance with the adapted synchronization are shifted in order to each start a respective time-slot designated for the respective frame according to said synchronization information containing timing information related to said specific control channel of the mobile communications system.

9. A method as claimed in claim 8, wherein:

said transmitting of synchronization information includes transmitting from said first mobile station a transmission of said first mobile station in accordance with said adapted synchronization so that the start time of each frame according to the adapted synchronization to be transmitted on said direct mode channel is shifted with respect to the synchronization of said specific control channel such that a first time-slot according to the adapted synchronization coincides with a first uplink time-slot of said specific control channel.

10. A method as claimed in claim 8, wherein:

said transmitting of synchronization information includes transmitting from said first mobile station in accordance with said adapted synchronization such that the start time of each frame according to the adapted synchronization to be transmitted on said direct mode channel is shifted with respect to the synchronization of said specific control channel so that each frame according to the adapted synchronization of said direct mode channel coincides with a respective corresponding uplink frame of said specific control channel of the mobile communications system.

11. A mobile communications system comprising:

at least one base station arranged for communicating on system channels of the mobile communications system, including on at least one control channel and on at least one traffic channel;

a first mobile station arranged for communicating on a direct mode channel divided into frames consisting of time-slots; and communicating means for communicating on a specific said control channel of a said base station timing information related to said specific control channel, to said first mobile station, wherein:

said first mobile station is, in response to receiving from said communicating means an identifier identifying said specific control channel and said timing information, arranged to switch to dual watch mode for communicating alternatively on said direct mode channel and said specific control channel during a time indicated by said timing information.

12. A mobile station arranged for communicating on a direct mode channel divided into frames consisting of time-slots, comprising:

memory means;

a transceiver arranged to receive and transmit transmissions of said mobile station;

a controller for controlling operation of said mobile station; and said transceiver including transmitter arranged for transmitting, to one or more second mobile stations on said direct mode channel, synchronization information containing an identifier of a mobile communications system used and an identifier of a specific control channel allocated to said mobile station, as well as timing information related to said control channel, wherein:

identifier of said specific control channel and said timing information are arranged to cause said one or more second mobile stations to switch to dual watch mode for communicating alternatively on said direct mode channel and specific control channel during a time indicated by said timing information.

13. A mobile station arranged for communicating on a direct mode channel divided into frames consisting of time-slots comprising:

memory means:

a transceiver arranged to receive and transmit transmissions of said mobile station;

a controller for controlling operation of said mobile station; and said transceiver including transmitter arranged for transmitting, to one or more second mobile stations on said direct mode channel, synchronization information containing an identifier of a mobile communications system used and an identifier of a specific control channel allocated to said mobile station, as well as timing information related to said control channel, a synchronization for shifting the start time of a frame or a time-slot of a transmission on said direct mode channel with respect to the start time of a frame or a time-slot in accordance with the synchronization of said specific control channel of said mobile communications system in response to the synchronization information transmitted by a second mobile station, or a base station or a repeater station of the mobile communications system.

14. A mobile station as claimed in claim 13, wherein:

said memory means is arranged to store therein said synchronization information transmitted by said second mobile station, said base station or said repeater station of the mobile communications system and received by said transceiver, said synchronization information indicating the start time of a frame or a time-slot in accordance with an adapted synchronization with respect to start time of a TDMA frame or time-slot.

15. A mobile station arranged for communicating on a direct mode channel divided into frames consisting of time-slots, comprising:

memory means;

a transceiver arranged to receive and transmit transmissions of said mobile station, a controller for controlling operation of said mobile station, a synchronizator for shifting the start time of a frame or a time-slot of a transmission on said direct mode channel with respect to the start time of a frame or a time-slot in accordance with the synchronization of a specific control channel of a mobile communications system in response to the synchronization information transmitted by a second mobile station, or a base station or a repeater station of the mobile communications system, wherein:

said memory means is arranged to store therein said synchronization information transmitted by said second mobile station said base station or said repeater station of the mobile communications system and received by said transceiver, said synchronization information indicating the start time of a frame or a time-slot in accordance with the adapted synchronization with respect to a start time of a TDMA frame or time-slot.

* * * * *